W. B. RODMAN.

HINGE.

APPLICATION FILED MAY 2, 1908.

12,876. Reissued Nov. 10, 1908.

WITNESSES

G. Robert Thomas

C. W. Fairbank

INVENTOR

William Boyd Rodman

BY Munn & Co.

ATTORNEYS

UNITED STATES PATENT OFFICE.

WILLIAM BOYD RODMAN, OF CHARLESTON, SOUTH CAROLINA.

HINGE.

No. 12,876. Specification of Reissued Letters Patent. Reissued Nov. 10, 1908.

Original No. 879,067, dated February 11, 1908, Serial No. 390,903. Application for reissue filed May 2, 1908. Serial No. 430,620.

*To all whom it may concern:*

Be it known that I, WILLIAM BOYD RODMAN, a citizen of the United States, and a resident of Charleston, in the county of Charleston and State of South Carolina, have invented a new and Improved Hinge, of which the following is a full, clear, and exact description.

This invention relates to door or other hinges formed of cast or plate metal, of a class known as butt hinges, and has for its object to provide a hinge in which the two main leaves are connected by lazy tongs formed of two intermediate leaves arranged in series with the main leaves, and also by two auxiliary leaves arranged in series with the main leaves, each auxiliary leaf being connected to the opposite intermediate leaf.

A further object of the invention is to provide novel details of construction for a butt hinge, which render it light, strong and capable of close folding into recesses in the edge of a door and a corresponding edge of a casement, so as to conceal the hinge and permit a close folding of the door on the casement at the hinged edge thereof, and also permit the door to be completely opened, so as to lie flat against the casement and adjacent side wall.

The invention consists in the novel construction and combination of parts, as is hereinafter described and defined in the appended claims.

Figure 1:
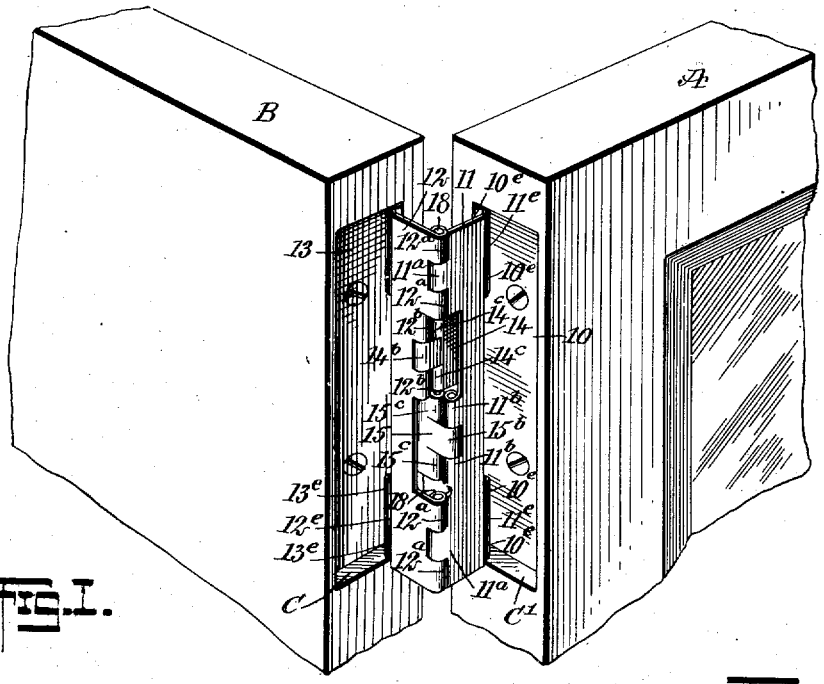
Figure 2:
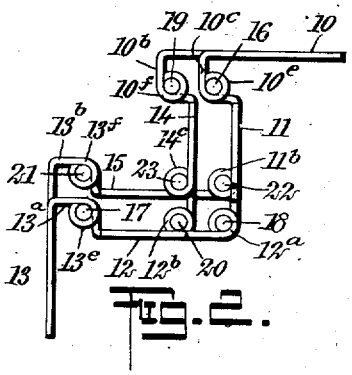
Figure 3:
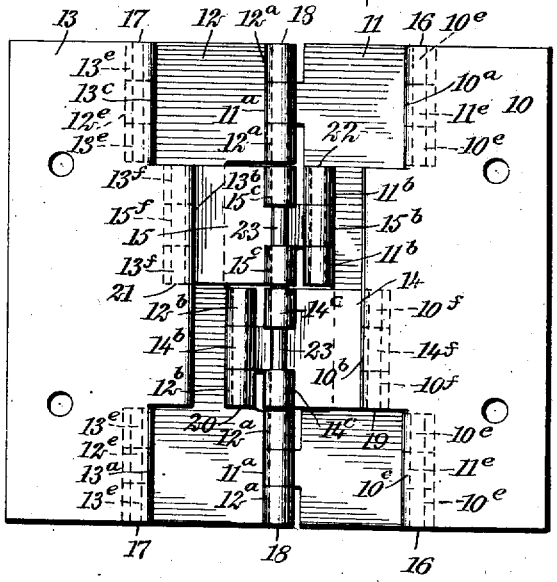

Reference is to be had to the accompanying drawings, forming a part of this specification, in which similar characters of reference indicate corresponding parts in all the views, and in which Figure 1 is a perspective view of my improved door hinge mounted upon portions of a door and casement, the door being opened 90 degrees; Fig. 2 is an end view of the hinge, the parts being in the position illustrated in Fig. 1, and Fig. 3 is a view of the reverse side in inverted position, of my hinge in its fully opened position.

My improved hinge comprises six leaf sections 10, 11, 12, 13, 14 and 15. Two of these, 10 and 13, constitute what are hereinafter referred to as the main leaf sections and are secured within recesses C and C′ in a door A and a casement B. Two other of the leaves, 11 and 12, constitute what are hereinafter referred to as the intermediate leaf sections, and are of a length substantially equal to the length of the main sections and are hinged together and to the main leaf sections, so that the four sections 10, 11, 12 and 13 are connected together in series. The two leaf sections 14 and 15, hereinafter referred to as the auxiliary leaf sections, are also hinged together and to the main leaf sections, so as to connect them in series, but each of the auxiliary leaves is also connected to the opposite intermediate leaf section. Thus, the leaf 11 is hinged to 10, 15 and 12, and the leaf 14 is also hinged to 10, 15 and 12. This retains the leaves 11 and 14 in substantially parallel planes, and retains the leaves 12 and 15 in substantially parallel planes, so that any movement of any one of the leaf sections in respect to any other leaf section is accompanied by a definite and predetermined movement of each and all of the other leaf sections.

The leaves are preferably connected by short arms and pintle sleeves integral with the leaf sections and retaining a plurality of pintles. Preferably, the leaf section 10 is provided with three arms $10^a$, $10^b$ and $10^c$. Each arm is of a length substantially equal to one-quarter the length of the leaf section, and the arms $10^a$ and $10^c$ are in substantially the same plane, while the arm $10^b$ is in a plane parallel to the plane of the other two arms. The arm $10^b$ extends from the center of the leaf section to a point adjacent the end of the arm $10^c$, there being no arm between the center of the leaf section and the end of the arm $10^a$. The leaf section 13 is identical with the leaf section 10, save that it is turned end to end. The leaf section 13 is provided with its two arms $13^a$ and $13^c$ adjacent the ends thereof, and its arm $13^b$ intermediate the arm $13^c$ and the center of the section. The arms $10^a$ and $10^c$ each terminates in two pintle sleeves $10^e$, and all four of these pintle sleeves are in alinement. The arm $10^b$ terminates in two pintle sleeves $10^f$, $10^f$ in alinement with each other and parallel to the pintle sleeves $10^e$. Likewise, the arms $13^a$ and $13^c$ terminates in sleeves $13^e$, and the arm $13^b$ terminates in pintle sleeves $13^f$.

The intermediate leaf 11 is provided with two pintle sleeves $11^e$ in alinement with each other and adapted for insertion intermediate the two pairs of pintle sleeves $10^e$ and to be held therein by pintles 16. The other intermediate leaf 12 is provided with corresponding pintle sleeves $12^e$ along one edge and adjacent opposite ends, and adapted for insertion between the pairs of pintle sleeves $13^e$ of the leaf 13 and to be held therein by pintles 17. The two intermediate leaves 11 and 12, at their adjacent edges, are hinged together at opposite ends, the leaf 12 being provided with pairs of pintle sleeves $12^a$, and the leaf 11 with single pintle sleeves $11^a$, adapted for insertion between the pairs of pintle sleeves $12^a$. The pintle sleeves $12^a$ and $11^a$ are held together by pintles 18. Thus the leaves 10 and 13 are connected through the pintles 16, 18 and 17. The intermediate leaf 11 also carries two pintle sleeves $11^b$, $11^b$, upon the same edge thereof as the pintle sleeves $11^a$ but out of alinement therewith and substantially parallel thereto. These pintle sleeves serve for the connection of the auxiliary leaf to the opposite intermediate leaf, as hereinafter more fully set forth. The intermediate leaf 12 carries pintle sleeves $12^b$, $12^b$, extending to the pintle sleeves $11^b$, $11^b$, but extending from the center of the sleeve in the opposite direction.

The auxiliary leaves 14 and 15 are connected together and each of said leaves is connected to one of the main leaves and to the opposite intermediate leaf. Each auxiliary or controlling leaf is of a length substantially equal to one-quarter the total length of the hinge. The leaf 14 is provided with a pintle sleeve $14^f$, at one end thereof and adapted for insertion between the two pintle sleeves $10^f$, $10^f$, of the leaf 10, and secured thereto by a pintle 19. At the opposite end of the leaf 14, there is provided three pintle sleeves, the center one of which, $14^b$, is adapted for insertion between the two pintle sleeves $12^b$ of the sleeve 12 and is secured thereto by a pintle 20. The other two pintle sleeves $14^c$, $14^c$, are substantially parallel to the sleeve $14^b$, but are spaced a short distance therefrom to receive a separate pintle as hereinafter described. The leaf 15 is identical with the leaf 14. It is provided with its terminal sleeve $15^f$ adapted to be secured between the pintle sleeves $13^f$ by the pintle 21, and at its opposite edge is the pintle sleeve $15^b$ adapted to be secured between the pintle sleeves $11^b$ by a pintle 22. Adjacent the pintle sleeve 15 and parallel therewith, there is provided two pintle sleeves $15^c$, which are held in alinement with the sleeves $14^c$ by a pintle 23. This pintle is of a length equal to twice the length of each of the other pintles, and serves as a pivot pin to connect the leaves 14 and 15 intermediate their ends.

The leaves 14 and 15 act not only as auxiliary leaves to connect the outer or main leaves 10 and 13 through the pintles 19, 23 and 21, but they also serve to control the movements of the two leaves 11 and 12 in respect to the leaves 10 and 13. The leaves 12 and 15 are held in parallelism, and the leaves 11 and 14 are also held in parallelism, so that any movement of any leaf section in respect to any other leaf section, causes a definite and predetermined movement of each and all of the other leaf sections and causes the hinge to flex properly when the door is swung to open or close it, and, at the same time, permit all of these sections to fold together compactly within the recesses C and C′ of the casement and the door.

Any number of hinges may be employed for the proper support of a heavy door, and by the construction and arrangement of the parts thereof as described, the door may be swung so as to lie flat against the side of the casement or slot adjacent thereto, or be opened any distance with ease.

It is understood that the improved hinge may be formed in any size desired, and be applied to hinge the lid on boxes or for any other analogous use; furthermore, it may be produced from plate metal cut and bent into form, or be cast into shape from any preferred metal as may be desired.

Having thus described my invention, I claim as new and desire to secure by Letters Patent:

1. A hinge, comprising a plurality of leaf sections pivotally connected together in series, and controlling members pivoted together intermediate their ends and each having its opposite ends pivoted to alternate leaf sections of said series.

2. A hinge comprising two main leaf sections, two intermediate leaf sections pivoted together and pivoted to said main leaf sections to form a series, and two controlling members pivoted together intermediate their ends and each having its ends pivoted to one main leaf section and the opposite intermediate leaf section.

3. A hinge, comprising four leaf sections of substantially equal length and pivotally connected together in series, the two outermost sections having arms extending at an angle therefrom at the edges thereof adjacent the intermediate sections, whereby when said hinge is in closed position, the intermediate sections fold between the outermost sections, and when said hinge is in open position, said intermediate sections lie in a plane parallel to the plane of the outermost sections.

4. A hinge, comprising four leaf sections of substantially equal length and pivotally connected together in series, the two outermost sections having arms extending at an angle therefrom at the edges thereof adjacent the intermediate sections, whereby when said hinge is in closed position, the intermediate sections fold between the outermost sections, and when said hinge is in open position, said intermediate sections lie in a plane parallel to the plane of the outermost sections, and means connecting alternate leaves, whereby any movement of one leaf in respect to any other leaf, causes a definite and predetermined movement of the remaining leaves.

5. A hinge, comprising four flat leaves, two leaves that are outermost having screw-holes therein, a series of spaced short arms projected at a right angle from like side edges on said perforated sections, pintle sleeves formed on the ends of the arms on each leaf section, and alined with each other, the remaining intermediate pair of leaf sections having laterally-offset spaced pintle sleeves thereon that are alternated and alined with each other, and pintle rods connecting said alined sleeves.

In testimony whereof I have signed my name to this specification in the presence of two subscribing witnesses.

WILLIAM BOYD RODMAN.

Witnesses:-

W. H. Cogswell,

J. P. Denham.